J. R. HARRIS.

Improvement in Plows.

No. 128,390.  Patented June 25, 1872.

Witnesses:
P. C. Dietrich.
Wm. H. C. Smith.

Inventor:
J. R. Harris.
Per Munn & Co.
Attorneys.

128,390

UNITED STATES PATENT OFFICE.

JAMES R. HARRIS, OF HAZELHURST, MISSISSIPPI.

IMPROVEMENT IN PLOWS.

Specification forming part of Letters Patent No. 128,390, dated June 25, 1872.

*To all whom it may concern:*

Be it known that I, JAMES R. HARRIS, of Hazelhurst, in the county of Copiah and State of Mississippi, have invented a new and useful Improvement in Scraper-Attachment for Plows; and I do hereby declare that the following is a full, clear, and exact description thereof, which will enable others skilled in the art to make and use the same, reference being had to the accompanying drawing forming part of this specification, in which—

Figure 1:
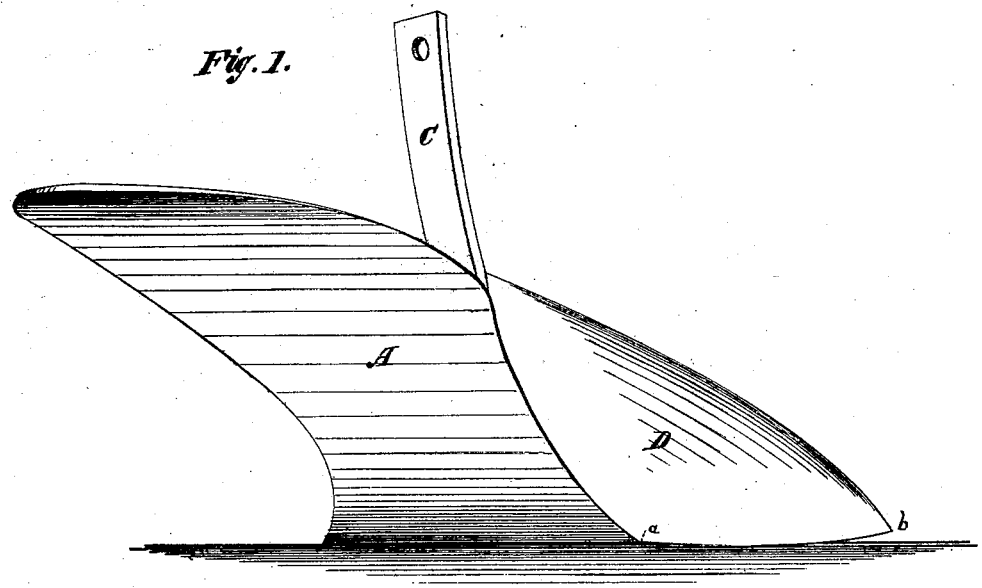
Figure 2:
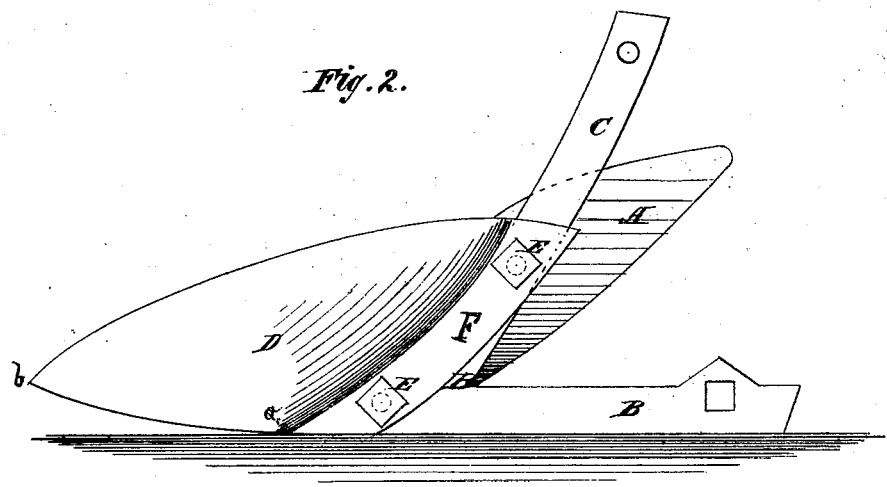

Figure 1 is a view of the mold-board side of a plow to which my improvement has been attached. Fig. 2 is a view of the land-side side of the same.

Similar letters of reference indicate corresponding parts.

My invention has for its object to furnish an improved scraper-attachment for ordinary plows for use in the cultivation of cotton, which shall be simple in construction, convenient in use, and effective in operation; and it consists in the construction of the scraper, and the arrangement of the same with the land-side and the mold-board of the plow, as hereinafter more fully described and pointed out by the claim.

In the drawing, A represents the mold-board; B, the land-side; and C, the standard to which the beam is attached in any convenient or suitable manner, the construction and arrangement of these parts being of the ordinary known form. D represents the scraper, which is arranged to form a continuation of the mold-board A. The lower cutting-edge of the said scraper is constructed so as to gradually rise from the plow-point at $a$ to the point of the scraper at $b$, so that in use the earth near the plants or growing crop will not be plowed or scraped so deep as to injure the roots of the plants. The scraper D is made with a slight concave form on its face, and formed with a flange, F, which in form is constructed to correspond with the form of the lower extension of the standard C, to which it is firmly secured by the bolts E E, so that the scraper and mold-board shall present a smooth surface upon the face at the point where the two parts meet.

I am aware that scrapers have been heretofore attached to the mold-boards of plows, and formed by an extension or continuation of the mold-board being a part of the same. In attaching the scraper to the mold-board, a smooth surface is not presented where the two parts meet, and it is further necessary to perforate the wearing surface of the mold-board in order to secure the two parts together, and where the scraper is made a part of the mold-board it is necessary to have an extra mold-board in order to use the implement as a common turn-plow; when by my improved construction all such objections are overcome.

Having thus fully described my invention, what I claim, and desire to secure by Letters Patent, is—

1. The combination of the standard C, mold-board A, and scraper D, when the latter is formed with the flange F, and secured to the standard C by the bolts E E, and arranged substantially as specified, and for the purpose set forth.

2. The scraper D, when constructed with the flange F and gradually rising cutting-edge, substantially as and for the purpose described.

JAMES R. HARRIS.

Witnesses:
L. B. HARRIS,
C. A. TALIAFERRO.